US011010181B1

(12) United States Patent
Diwakaran et al.

(10) Patent No.: US 11,010,181 B1
(45) Date of Patent: May 18, 2021

(54) POP-UP FREE PROTECTED OPERATIONS

(71) Applicant: Digital.ai Software, Inc., Burlington, MA (US)

(72) Inventors: Umakanthan Diwakaran, Chennai (IN); Rahul Kapoor, Bellevue, WA (US)

(73) Assignee: Digital.ai Software, Inc., Burlington, MA (US)

( * ) Notice: Subject to any disclaimer, the term of this patent is extended or adjusted under 35 U.S.C. 154(b) by 0 days.

(21) Appl. No.: 17/106,146

(22) Filed: Nov. 29, 2020

(51) Int. Cl.
*G06F 9/451* (2018.01)
*G06F 21/62* (2013.01)
*G06F 3/0484* (2013.01)
*H04L 12/58* (2006.01)

(52) U.S. Cl.
CPC ............ *G06F 9/453* (2018.02); *G06F 3/0484* (2013.01); *G06F 21/629* (2013.01); *H04L 51/04* (2013.01)

(58) Field of Classification Search
CPC ...... G06F 9/453; G06F 3/0484; G06F 21/629; H04L 51/04
See application file for complete search history.

(56) References Cited

U.S. PATENT DOCUMENTS

| 2008/0239329 | A1* | 10/2008 | Kitada | H04N 1/00244 358/1.1 |
| 2011/0010672 | A1* | 1/2011 | Hope | G06F 3/0486 715/841 |
| 2017/0085731 | A1* | 3/2017 | Akuzawa | H04N 1/00411 |
| 2019/0158690 | A1* | 5/2019 | Shino | H04N 1/00474 |

* cited by examiner

*Primary Examiner* — Tadesse Hailu
(74) *Attorney, Agent, or Firm* — Rahman LLC

(57) ABSTRACT

A method for enabling performance of a protected computer operation on a protected item without pop-up confirmation dialogs being generated, is provided. The method includes performing a first action on a first element of a user interface of a computing device, the first action is associated with the protected computer operation by processing a first response that is a first input into the computing device. Performing the first action on the first element of the user interface enables a second element of the user interface to perform the protected computer operation. The protected computer operation is performed by processing a second response that is a second input into the computing device.

18 Claims, 10 Drawing Sheets

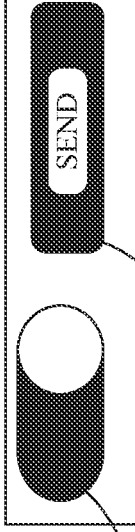

500B

NEW MESSAGE

TO: mark@abccorp.com;

SUBJECT: Sales report - Last month

HI MARK,

Please find attached sales report for last month.

Please join for a team meeting on November 17, 2020 to discuss the sales report.

Thank you.

Regards,
John,
Sales executive.

SEND

510

508

POP-UP FREE PROTECTED OPERATIONS

BACKGROUND

Technical Field

The present disclosure relates to a technique for enabling performance of a protected computer operation on a protected item without pop-up confirmation dialogs.

Description of the Related Art

In software systems, many irreversible operations are protected via a confirmation pop-up. For example, a delete operation is one such operation, where the users are prompted for a dialog or a pop-up for confirmation before the delete operation is performed.

The dialog or the pop-up may diminish user experience in software systems since, an additional dialog pops up and obscures the user interface screen, and all user operations may need to be disabled until the dialog is dismissed. Sometimes, such a dialog may accidentally be moved into background blocking other operations. The user may find it difficult to understand why operations are blocked as the confirmation dialog itself is not visible. Especially, on mobile devices with small screens, forcing such popups for confirmation before performing an operation greatly diminishes the user experience on the mobile devices.

Further, some of the pop-ups are timed pop-outs. For example, in an email service, a timed pop-up may appear once the delete operation is performed as a one-step process, to allow for undoing of the delete operation. However, the timed pop-up may disappear in a few moments. Such an approach does not generalize to all scenarios, for example deleting an entity like a webhook subscription is not the same as deleting a bunch of emails. Also, if the user deletes an item and navigates away from the current screen, the timed pop-up disappears. Such behavior is not a norm for the users of enterprise business applications. Likewise, if the user deletes multiple items in quick succession, the undo option becomes ineffective. In some email services, just a last operation is undone but an ambiguity of what to undo or the implicit choice of undoing the last operation may not be acceptable in all scenarios (e.g., for enterprise business applications).

In a file manager application, though delete is still a two-step process with a confirmation dialog, a deleted file can be browsed and recovered from a temporary storage (e.g., recycle bin), a file system-wide repository of deleted items. However, relying entirely on the temporary storage without any safety mechanism is inconvenient in some scenarios.

Therefore, there arises a need to address the aforementioned technical drawbacks in existing systems or technologies in performing protected operations.

SUMMARY

In view of the foregoing, there is provided a processor-implemented method for enabling performance of a protected computer operation on a protected item without pop-up confirmation dialogs being generated. The method includes performing a first action on a first element of a user interface of a computing device, the first action is associated with the protected computer operation, by processing a first response that is a first input into the computing device. Performing the first action on the first element of the user interface enables a second element of the user interface to perform the protected computer operation. The protected computer operation is performed by processing a second response that is a second input into the computing device.

In some embodiments, the method includes creating a preconfigured rule that performs the protected computer operation by default without a need for performing the first action on the first element of the user interface to enable the second element of the user interface to perform the protected computer operation. The preconfigured rule may be created to maintain a balance between safety and usability of the protected computer operation in conjunction with existing auxiliary capabilities available to safeguard the protected item.

In some embodiments, the method includes storing the preconfigured rule in a rule database including a rule configuration module that is embedded as part of the user interface for the protected item and the rule configuration module varies based on the protected item.

In some embodiments, the rule database includes: (i) a static rule that is dependent on first attributes of the protected item that do not change as part of the protected computer operation, and (ii) a dynamic rule that is dependent on second attributes of the protected item that are changeable as part of the protected computer operation.

In some embodiments, the protected computer operation includes: (i) temporarily deleting an item, (ii) permanently deleting an item, (iii) sending an email, or (iv) sending a message.

In some embodiments, the protected computer operation of sending the email or sending the message utilizes performance of the first action on the first element of the user interface to enable the second element of the user interface to perform the protected computer operation unless the first action is automatically performed based on a dynamic rule that processes an email recipient list attribute or a message recipient list attribute to determine that a number of recipients is less than a preconfigured number of recipients, or a recipient list excludes a preconfigured list of recipients. The recipient list may include an email recipient list or a message recipient list.

In some embodiments, if the number of recipients is greater than the preconfigured number of recipients, or the recipient list includes a preconfigured list of recipients, the method utilizes performance of the first action on the first element of the user interface to enable the second element of the user interface to perform the protected computer operation of sending the email or sending the message.

In some embodiments, deleting an item is enabled by default for usability, upon determining based on a static rule specifying locations where performance of the first action on the first element of the user interface to enable the second element of the user interface to perform the protected computer operation is not utilized. The static rule may be created for improving the usability of the protected computer operation given an existence of auxiliary capabilities available to safeguard the protected computer operation.

In one aspect, there is provided a system for enabling performance of a protected computer operation on a protected item without pop-up confirmation dialogs being generated. The system includes a computing device that includes a memory that stores a set of instructions, and a processor that executes the set of instructions. The processor performs a first action on a first element of a user interface of the computing device, the first action is associated with the protected computer operation, by processing a first response that is a first input into the computing device.

Performing the first action on the first element of the user interface enables a second element of the user interface to perform the protected computer operation. The protected computer operation is performed by processing a second response that is a second input into the computing device.

In some embodiments, the processor creates a preconfigured rule that performs the protected computer operation by default without a need for performing the first action on the first element of the user interface to enable the second element of the user interface to perform the protected computer operation. The preconfigured rule may be created to maintain a balance between safety and usability of the protected computer operation in conjunction with existing auxiliary capabilities available to safeguard the protected item.

In some embodiments, the processor stores the preconfigured rule in a rule database including a rule configuration module that is embedded as part of the user interface for the protected item and the rule configuration module varies based on the protected item.

In some embodiments, the rule database includes; (i) a static rule that is dependent on first attributes of the protected item that do not change as part of the protected computer operation, and (ii) a dynamic rule that is dependent on second attributes of the protected item that are changeable as part of the protected computer operation.

In some embodiments, the protected computer operation includes: (i) temporarily deleting an item, (ii) permanently deleting an item, (iii) sending an email, or (iv) sending a message.

In some embodiments, the protected computer operation of sending the email or sending the message utilizes performance of the first action on the first element of the user interface to enable the second element of the user interface to perform the protected computer operation unless the first action is automatically performed based on a dynamic rule that processes an email recipient list attribute or a message recipient list attribute to determine that a number of recipients is less than a preconfigured number of recipients, or a recipient list excludes a preconfigured list of recipients. The recipient list may include an email recipient list or a message recipient list.

In some embodiments, if the number of recipients is greater than the preconfigured number of recipients, or the recipient list comprises a preconfigured list of recipients, the processor utilizes performance of the first action on the first element of the user interface to enable the second element of the user interface to perform the protected computer operation of sending the email or sending the message.

In some embodiments, the processor enables the protected computer operation of deleting an item by default for usability, upon determining based on a static rule specifying locations where performance of the first action on the first element of the user interface to enable the second element of the user interface to perform the protected computer operation is not utilized. The static rule may be created for improving the usability of the protected computer operation given an existence of auxiliary capabilities available to safeguard the protected computer operation.

In one aspect, there is provided one or more non-transitory computer readable storage mediums storing one or more sequences of instructions, which when executed by one or more processors, causes a method for enabling performance of a protected computer operation on a protected item without pop-up confirmation dialogs being generated. The method includes performing a first action on a first element of a user interface of a computing device, the first action is associated with the protected computer operation, by processing a first response that is a first input into the computing device. Performing the first action on the first element of the user interface enables a second element of the user interface to perform the protected computer operation. The protected computer operation is performed by processing a second response that is a second input into the computing device.

In some embodiments, the method includes creating a preconfigured rule that performs the protected computer operation by default without a need for performing the first action on the first element of the user interface to enable the second element of the user interface to perform the protected computer operation. The preconfigured rule may be created to maintain a balance between safety and usability of the protected computer operation in conjunction with existing auxiliary capabilities available to safeguard the protected item.

In some embodiments, the method includes storing the preconfigured rule in a rule database including a rule configuration module that is embedded as part of the user interface for the protected item and the rule configuration module varies based on the protected item.

In some embodiments, the rule database includes: (i) a static rule that is dependent on first attributes of the protected item that do not change as part of the protected computer operation, and (ii) a dynamic rule that is dependent on second attributes of the protected item that are changeable as part of the protected computer operation.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 4B is an exemplary representation of a user interface for sending an email without pop-up confirmation dialogs where a first element and a second element of the user interface are enabled according to an embodiment herein;

DETAILED DESCRIPTION

Figure 1:
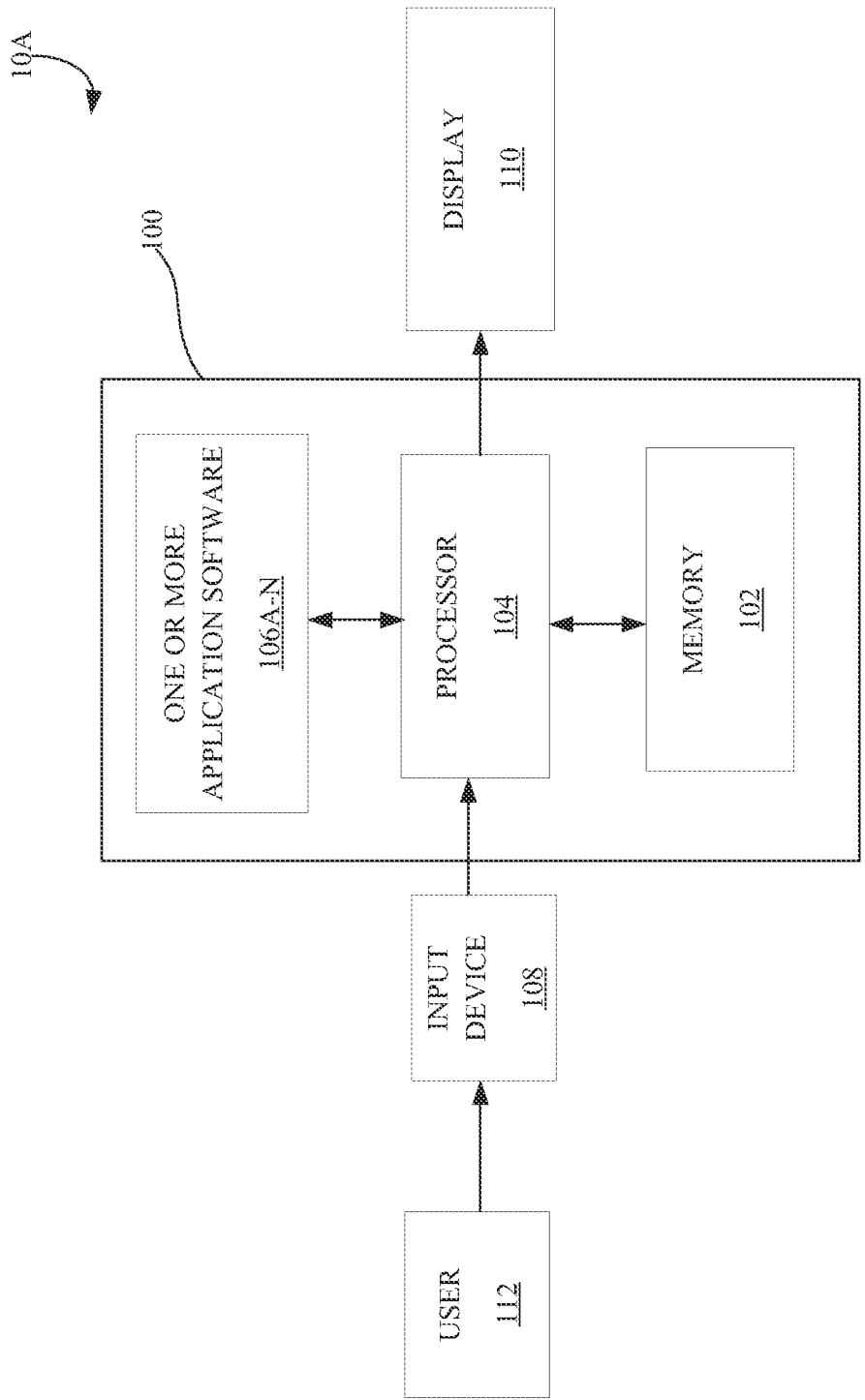
FIG. 1 is a block diagram that illustrates a system for enabling performance of a protected computer operation on a protected item without pop-up confirmation dialogs being generated according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments disclosed herein provide a system and a method for enabling performance of a protected computer operation on a protected item without pop-up confirmation dialogs. Referring now to the drawings, and more particularly to FIGS. 1 through 6, where similar reference characters denote corresponding features consistently throughout the figures, example embodiments are shown.

As used herein, several terms are defined below:

The term "user interface" refers to a point of human and computer interaction through which the human may also interact with a device or application software. The user interface may include a display screen, a keyboard, a mouse, or any other input devices.

The term "element of user interface" refers to an element that is used to represent an information visually to a user. Examples of the element of user interface include, but not limited to input controls, navigation components, information components, and containers.

The term "application software" refers to a program or group of computer programs designed for end users.

The term "protected computer operation" refers to an operation on a user interface that is protected through a safety mechanism.

The term "protected item" refers to an item on which the protected computer operation is performed.

The term "preconfigured rule" refers to a rule or instruction that is defined by a user or an admin.

The term "rule database" refers to a storage medium that stores a set of rules or instructions.

The term "static rule" refers to a rule that depends on attributes of the protected item that do not change as part of the protected computer operation.

The term "dynamic rule" refers to a rule that depends on attributes of the protected item that are changeable as part of the protected computer operation.

The term "safety" of a protected computer operation refers to avoiding accidental delete of an item like a file, or inadvertent sending of an item like an email or message. The term "usability" refers to minimizing extra clicks required to perform an operation like deleting a file or sending an email/message, due to a first input being required before the operation can be performed on a second input. As there is a tradeoff between "safety" and "usability" the static and dynamic rules are created to strike an appropriate balance between the two.

The term "auxiliary capabilities" in the context of a protected computer operation on a protected item refers to capabilities like a recycle bin that could protect an item like a file from accidental deletes, or delayed send or recall ability for an item like an email or a message that could be used to minimize or recover from inadvertent sending of the email or message.

In an exemplary embodiment, the various modules described herein and illustrated in the figures are embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process computer logic instructions capable of providing at least one digital signals or analog signals for performing various functions as described herein. The various functions can further be embodied and physically saved as any of data structures, data paths, data objects, data object models, object files, database components. For example, the data objects could be configured as a digital packet of structured data. The data structures could be configured as any of an array, tuple, map, union, variant, set, graph, tree, node, and an object, which may be stored and retrieved by computer memory and may be managed by processors, compilers, and other computer hardware components. The data paths can be configured as part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be configured as physical locations in computer memory and can be a variable, a data structure, or a function. In the embodiments configured as relational databases (e.g., such as Oracle® relational databases), the data objects can be configured as a table or column. Other configurations include specialized objects, distributed objects, object-oriented programming objects, and semantic web objects, for example. The data object models can be configured as an application programming interface for creating HyperText Markup Language (HTML) and Extensible Markup Language (XML) electronic documents. The models can be further configured as any of a tree, graph, container, list, map, queue, set, stack, and variations thereof. The data object files are created by compilers and assemblers and contain generated binary code and data for a source file. The database components can include any of tables, indexes, views, stored procedures, and triggers.

In an example, the embodiments herein can provide a computer program product configured to include a pre-configured set of instructions, which when performed, can result in actions as stated in conjunction with various figures herein. In an example, the pre-configured set of instructions can be stored on a tangible non-transitory computer readable medium. In an example, the tangible non-transitory computer readable medium can be configured to include the set of instructions, which when performed by a device, can cause the device to perform acts similar to the ones described here.

The embodiments herein may also include tangible and/or non-transitory computer-readable storage media for carrying or having computer-executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network. If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

FIG. 1 is a block diagram that illustrates a system 10A for enabling performance of a protected computer operation on a protected item without pop-up confirmation dialogs being generated according to an embodiment herein. The system 10A that includes a computing device 100 that includes a memory 102 that stores a set of instructions, a processor 104 that executes the set of instructions, and one or more application software 106A-N (where N is a positive integer). The processor 104 may perform the protected computer operation on the protected item; e.g., one or more application software 106A-N. Examples of the one or more application software 106A-N include, but not limited to, a word processor, a spreadsheet, a web browser, an email client, a media player, and a game launcher. The one or more application software 106A-N may a mobile application or a web application. The computing device 100 may receive one or more inputs from the user 112, through an input device 108 to perform the protected computer operation on at least one element of the user interface. The input device 108 may be a mouse, a keyboard, a microphone, a camera, or a touch pad. The one or more inputs may be a click response, an audio response, a video response, a touch response, or a gesture response. The system 10A may display an element of the user interface through a display 110.

The processor 104 performs a first action on a first element of the user interface of the computing device 100 by processing a first response that is a first input into the computing device 100. The first action is associated with the protected computer operation. The first input may be a click response, an audio response, a video response, a touch response, or a gesture response. Thereafter, performing the first action on the first element of the user interface enables a second element of the user interface to perform the protected computer operation. The protected computer operation is performed by processing a second response that is a second input into the computing device 100. The second input may be a click response, an audio response, a video response, a touch response, or a gesture response. The processor 104 may perform a second action on the second element of the user interface by processing the second response that is the second input into the computing device 100. The second action is the protected computer operation. The protected computer operation is thus a two-step process but for usability it may be made a one-step process based on predefined rules in some cases.

The protected computer operation may include: (i) temporarily deleting an item, (ii) permanently deleting an item, (iii) sending an email, (iv) sending a message, or (v) similar operations. The protected item may include the email, the message, the item, or a file. The first element of the user interface may a toggle button. The second element of the user interface may an action button (e.g., a delete button, a send button, etc.) corresponding to the protected computer operation.

In some embodiments, the processor 104 cannot directly perform the protected computer operation before performing the first action on the first element of the user interface associated with the protected computer operation. The first element and the second element of the user interface may be disabled before performing the first action on the first element of the user interface.

In some embodiments, the processor 104 creates a preconfigured rule that performs the protected computer operation by default without a need for performing the first action on the first element of the user interface to enable the second element of the user interface to perform the protected computer operation. The preconfigured rule may be created to maintain a balance between safety and usability of the protected computer operation in conjunction with existing auxiliary capabilities available to safeguard the protected item. The existing auxiliary capabilities may include capabilities like a recycle bin or delayed send or recall ability for email and messages.

A default state of the first element is controlled by the preconfigured rule. In some embodiments, the preconfigured rule may keep the first element disabled by default where the two-step process is utilized to perform the protected computer operation. For example, if the protected computer operation is a delete operation, the preconfigured rule may keep the first element disabled by default. In some embodiments, the preconfigured rule may keep the first element enabled by default for usability. For example, if the protected computer operation is a sending operation (e.g., sending the email or message), the preconfigured rule may keep the first element enabled by default.

The processor 104 may store the preconfigured rule in a rule database including a rule configuration module that is embedded as part of the user interface for the protected item and the rule configuration module varies based on the protected item.

The rule database may include (i) a static rule that is dependent on first attributes of the protected item that do not change as part of the protected computer operation, and (ii) a dynamic rule that is dependent on second attributes of the protected item that are changeable as part of the protected computer operation. The static rule may include 0 to n static rules, where n is greater than or equal to 0. The dynamic rule may include 0 to m dynamic rules, where m is greater than or equal to 0. Individual static rules are independent of each other. Similarly, individual dynamic rules are independent of each other. In one example, if the protected item is a file or folder, a static rule could be based on the protected items root folder attribute, such that if a root folder is a temporary folder (used for storing temporary files), the delete operation is not protected and enabled by default. In another example, if the protected item is an email or message, a dynamic rule could be based on the protected items recipient list attribute that is changeable as part of the protected send operation.

The processor 104, for the protected computer operation of sending the email or sending the message, may utilizes performance of the first action on the first element of the user interface to enable the second element of the user interface to perform the protected computer operation unless the first action is automatically performed based on a dynamic rule that processes an email recipient list attribute or a message recipient list attribute to determine that a number of recipients is less than a preconfigured number of recipients, or a recipient list excludes a preconfigured list of recipients. The recipient list may include an email recipient list or a message recipient list.

If the number of recipients is greater than the preconfigured number of recipients, the processor 104 may utilize performance of the first action on the first element of the user interface to enable the second element of the user interface to perform the protected computer operation of sending the email or sending the message. If the number of recipients is less than the preconfigured number of recipients, the preconfigured rule may perform sending the email or sending the message by default without the need for performing the first action on the first element of the user interface to enable the second element of the user interface to send the email or send the message.

As another example of a dynamic rule, if the recipient list includes a manager's email id, the preconfigured rule may keep the first element of the user interface disabled. In such a way, the chances of sending accidental or incomplete emails or messages to a manager or management can be minimized, so that sending the email or sending the message is possible only after performing the first action on the first element of the user interface to enable the second element of the user interface to send the email or send the message.

The processor 104 may enable the protected computer operation of deleting the item by default for usability, upon determining based on a static rule specifying locations where performance of the first action on the first element of the user interface to enable the second element of the user interface to perform the protected computer operation is not utilized. The static rule may be created for improving the usability of the protected computer operation given an existence of auxiliary capabilities available to safeguard the protected computer operation.

For example, for deleting an item in a file system, the preconfigured rule may keep the first element of the user interface disabled except for files in a temporary folder, so that the delete operation is performed after performing the first action on the first element of the user interface to enable the second element of the user interface to delete the item except for temporary files.

The preconfigured rule for enabling or disabling the first element of the user interface may also depend on the existing auxiliary capabilities available to safeguard the protected item. For example, if an auxiliary capability such as a recycle bin is available to safeguard the protected item, it is less critical to keep the first element of the user interface disabled and the preconfigured rule keeps the first element of the user interface enabled. If the auxiliary capability such as a recycle bin is not available to safeguard the protected item, the preconfigured rule may keep the first element of the user interface disabled.

Similarly, if there is a delayed send or recall email or message option, it is less critical to keep the first element of the user interface disabled by default for end user convenience. If there is no delayed send or recall email or message option, the preconfigured rule may keep the first element of the user interface disabled.

In some embodiments, the user interface of the computing device 100 does not display the first element based on a static rule or a dynamic rule where the second element is enabled by default for usability to perform the protected computer operation.

In some embodiments, the user interface of the computing device 100 is a voice input interface that receives a voice input into the computing device 100 for performing the protected computer operation. The processor 104 may perform a first action on a first element of the user interface of the computing device 100 by processing a first voice response, that is, a first voice input into the computing device 100. In the voice input interface, the first element of the user interface may be a first voice notification. Thereafter, performing the first action on the first element of the user interface enables a second element of the user interface to perform the protected computer operation. In the voice input interface, the second element of the user interface may be a second voice notification. The processor 104 may perform the protected computer operation by processing the second voice response, that is, a second voice input into the computing device 100.

In one example, the protected computer operation of deleting an item enables a protected delete operation after receiving the first voice input such as "enable file deletion", followed by deleting the item after receiving the second voice input such as "delete file". In another example, the protected computer operation of deleting an item is automatically enabled for usability upon determining based on a static rule specifying locations where the delete operation is performed by default after receiving a voice input, that is "delete file".

Similarly, in another example, if the number of recipients is greater than the preconfigured number of recipients or the recipient list includes a manager's email id which is determined by a dynamic rule, then the processor 104 provides a voice notification, for example, "The recipient list has too many recipients" or "The recipient list includes manager's email id" "Do you want to send anyway" and thereafter, the processor 104, if it receive a voice input, for example, "Yes Send" or "Cancel", enables or disables the protected computer operation of sending an email or a message.

The system 10A improves the user experience particularly on mobile devices, where throwing pop-up confirmations leave the user 112 with a less-than-desirable experience. The preconfigured rule-based control mechanism for enabling or disabling the first element of the user interface maintains the balance between safety and usability of the protected computer operation in conjunction with existing auxiliary capabilities available to safeguard the protected item.

Figure 2:
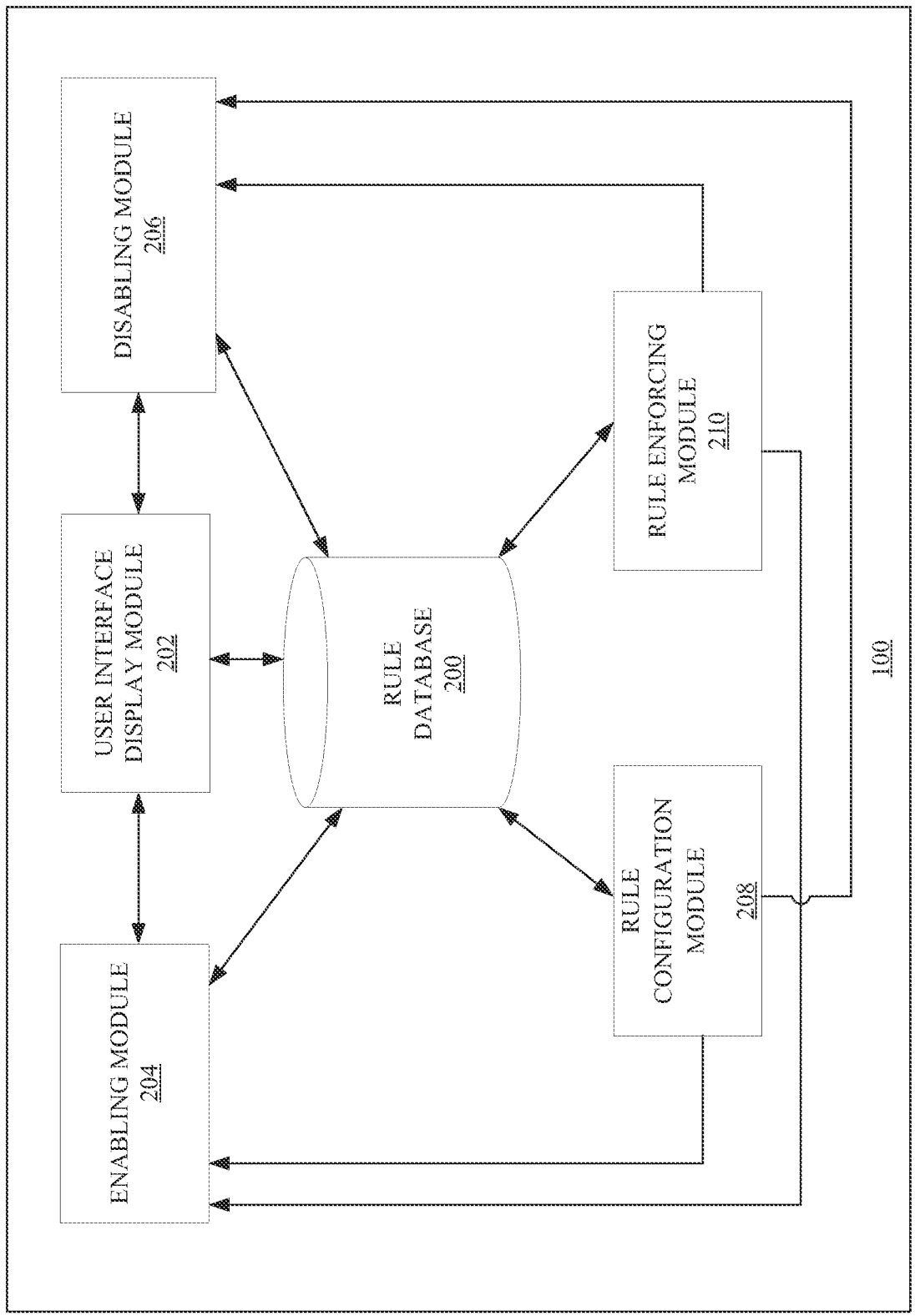
FIG. 2 illustrates an exploded view of a computing device of FIG. 1 according to an embodiment herein.

FIG. 2 illustrates an exploded view of the computing device 100 of FIG. 1 according to an embodiment herein. The computing device 100 includes a rule database 200, a user interface display module 202, an enabling module 204, a disabling module 206, a rule configuration module 208, and a rule enforcing module 210. The user interface display module 202 is configured to display a user interface where the user interface includes a first element and a second element. The location and style for the first element may vary based on the protected item. The enabling module 204 is configured to perform the first action on the first element of the user interface associated with the protected computer operation by processing the first response that is the first input into the computing device 100. The enabling module 204 is further configured to enable the second element of the user interface to perform the protected computer operation after performing the first action on the first element of the user interface. The protected computer operation is performed by processing the second response that is the second input into the computing device 100. The enabling module 204 enables the performance of the protected computer operation on the protected item on enabling of the first element of the user interface.

The rule configuration module 208 is configured to create the preconfigured rule that specifies the conditions in which the processor 104 is allowed to perform the protected computer operation by default without the need for performing the first action on the first element of the user interface to enable the second element of the user interface to perform the protected computer operation. The preconfigured rule is stored in the rule database 200. The preconfigured rule may be set by an admin or the user 112, or defaults may be set by the admin which may be overridden by the user 112.

The rule database 200 may include (i) the static rule that is dependent on the first attributes of the protected item that do not change as part of the protected computer operation, and (ii) the dynamic rule that are dependent on the second attributes of the protected item that are changeable as part of the protected computer operation. The rule configuration module 208 may be embedded as part of the user interface for the protected item and the rule configuration module 208 varies based on the protected item.

The rule enforcing module 210 is configured to enforce at least one of the static rule or the dynamic rule on the first element of the user interface to enable or disable the protected computer operation. The disabling module 206 is configured to disable the first element of the user interface which further disables the second element of the user interface based on the preconfigured rule. The disabling module 206 disables the protected computer operation on the protected item on disabling the first element of the user interface.

Figure 3A:
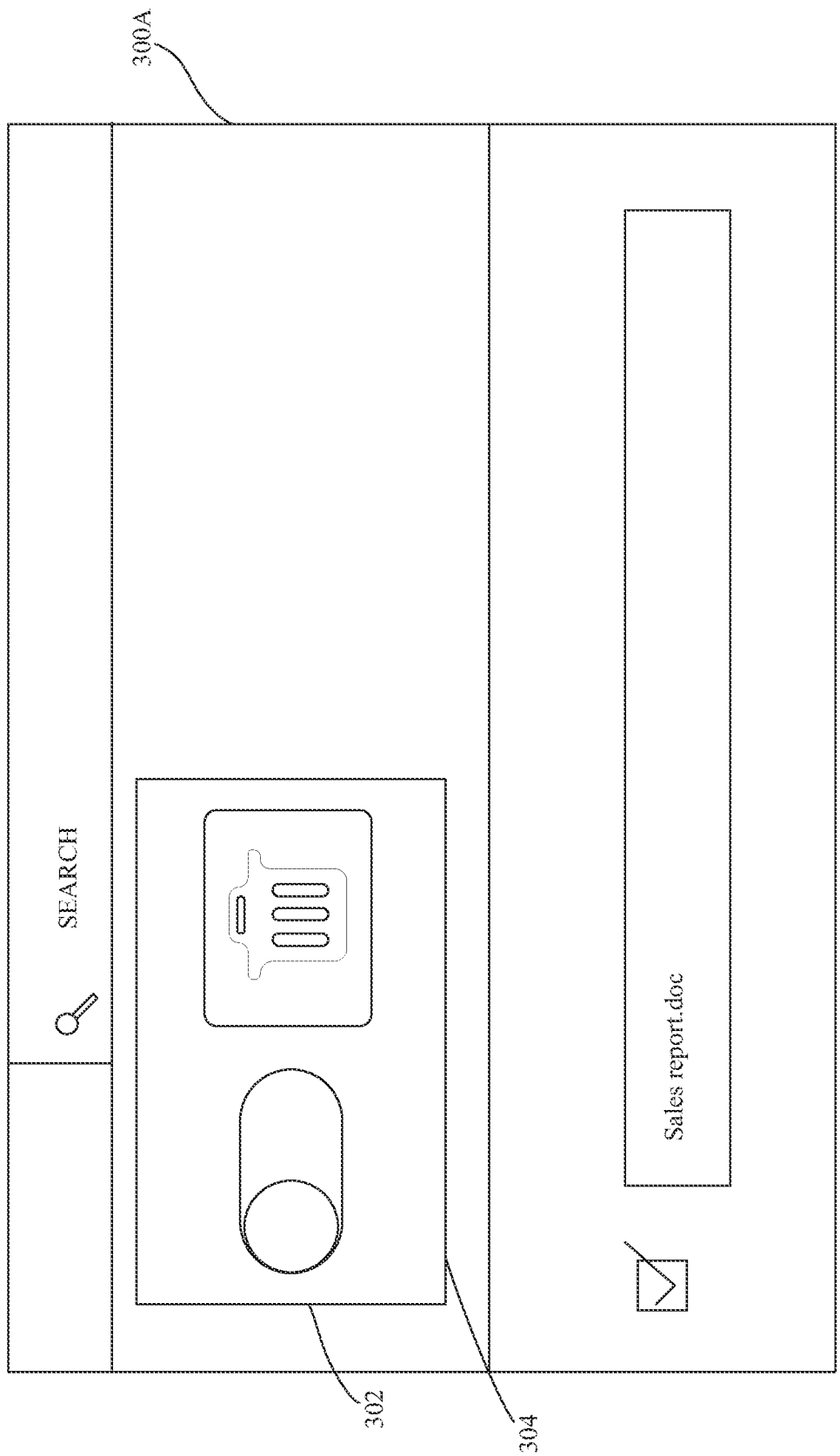
FIG. 3A is an exemplary representation of a user interface for a delete operation where a first element and a second element of the user interface are disabled according to an embodiment herein.

FIG. 3A, with reference to FIGS. 1 and 2, is an exemplary representation of a user interface 300A for a delete operation where a first element 302 and a second element 304 of the user interface 300A are disabled according to an embodiment herein. The user interface 300A comprises a delete widget for performing the delete operation to delete a protected item. The user interface 300A includes the first element 302 and the second element 304 that are in a disabled state to protect the protected item from the delete operation. A state of the first element 302 of the user interface 300A may be controlled through a preconfigured rule in the rule database 200. The preconfigured rule may keep the first element 302 of the user interface 300A in the disabled state. The first element 302 of the user interface 300A may be a toggle button. The second element 304 of the user interface 300A may be a delete button. The processor 104 may not be allowed to perform the delete operation to delete the item, by default, by performing a second action on the second element 304 of the user interface 300A as it is disabled. The second element 304 of the user interface 300A may be enabled after performing a first action to enable the first element 302 of the user interface 300A. For example, the preconfigured rule may be a static rule that keeps the first element 302 of the user interface 300A disabled except for files in a temporary folder, so that the delete operation is performed after performing the first action on the first element 302 of the user interface 300A to enable the second element 304 of the user interface 300A to delete the item except for temporary files.

Figure 3B:
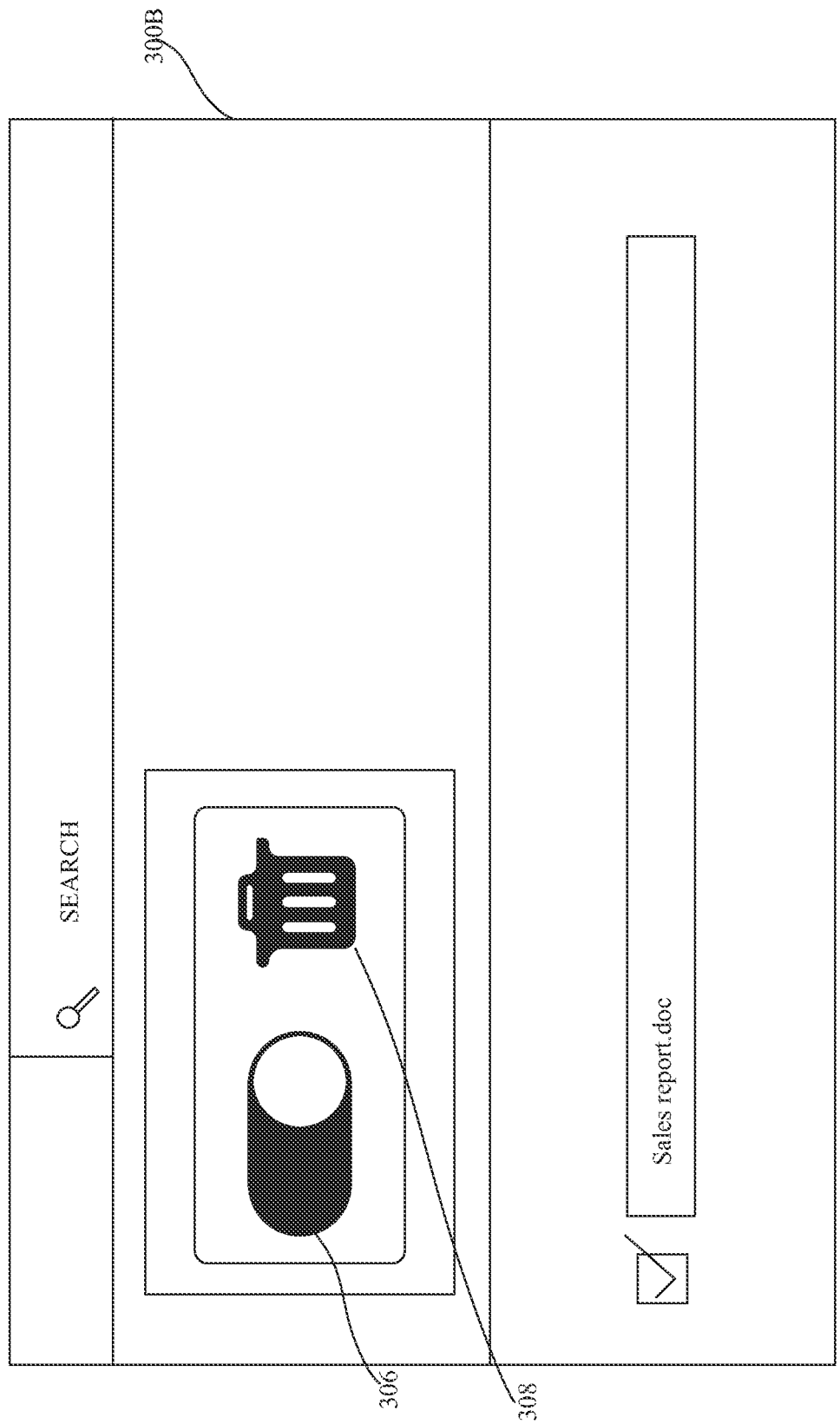
FIG. 3B is an exemplary representation of a user interface for a delete operation where a first element and a second element of a user interface are enabled according to an embodiment herein.

FIG. 3B, with reference to FIGS. 1 through 3A, is an exemplary representation of a user interface 300B for a delete operation where a first element 306 and a second element 308 of a user interface 300B are enabled according to an embodiment herein. The user interface 300B comprises a delete widget for performing the delete operation to delete a protected item. The user interface 300B includes the first element 306 and the second element 308 that are in an enabled state to perform the delete operation on the protected item. A state of the first element 302 of the user interface 300A may be controlled through a preconfigured rule in the rule database 200. The preconfigured rule may be a static rule or a dynamic rule. In some embodiments, the first element 306 and the second element 308 of the user interface 300B is in the enabled state, upon determining based on the static rule specifying locations where performance of the first action on the first element 306 of the user interface 300B to enable the second element 308 of the user interface 300B to perform the protected computer operation is not utilized. The static rule may be created for improving the usability of the protected computer operation given an existence of the auxiliary capabilities available to safeguard the protected computer operation. The first element 306 of the user interface 300B may be a toggle button. The second element 308 of the user interface 300B may be a delete button. In some embodiments, the processor 104 is allowed to perform the delete operation to delete the protected item by performing a second action on the second element 308 of the user interface 300B by default without a need for performing a first action on the first element 306 of the user interface 300B to enable the second element 308 of the user interface 300B to perform the delete operation. In some embodiments, the second element 308 of the user interface 300B is enabled to perform the delete operation after performing the first action on the first element 306 of the user interface 300B.

Figure 4A:
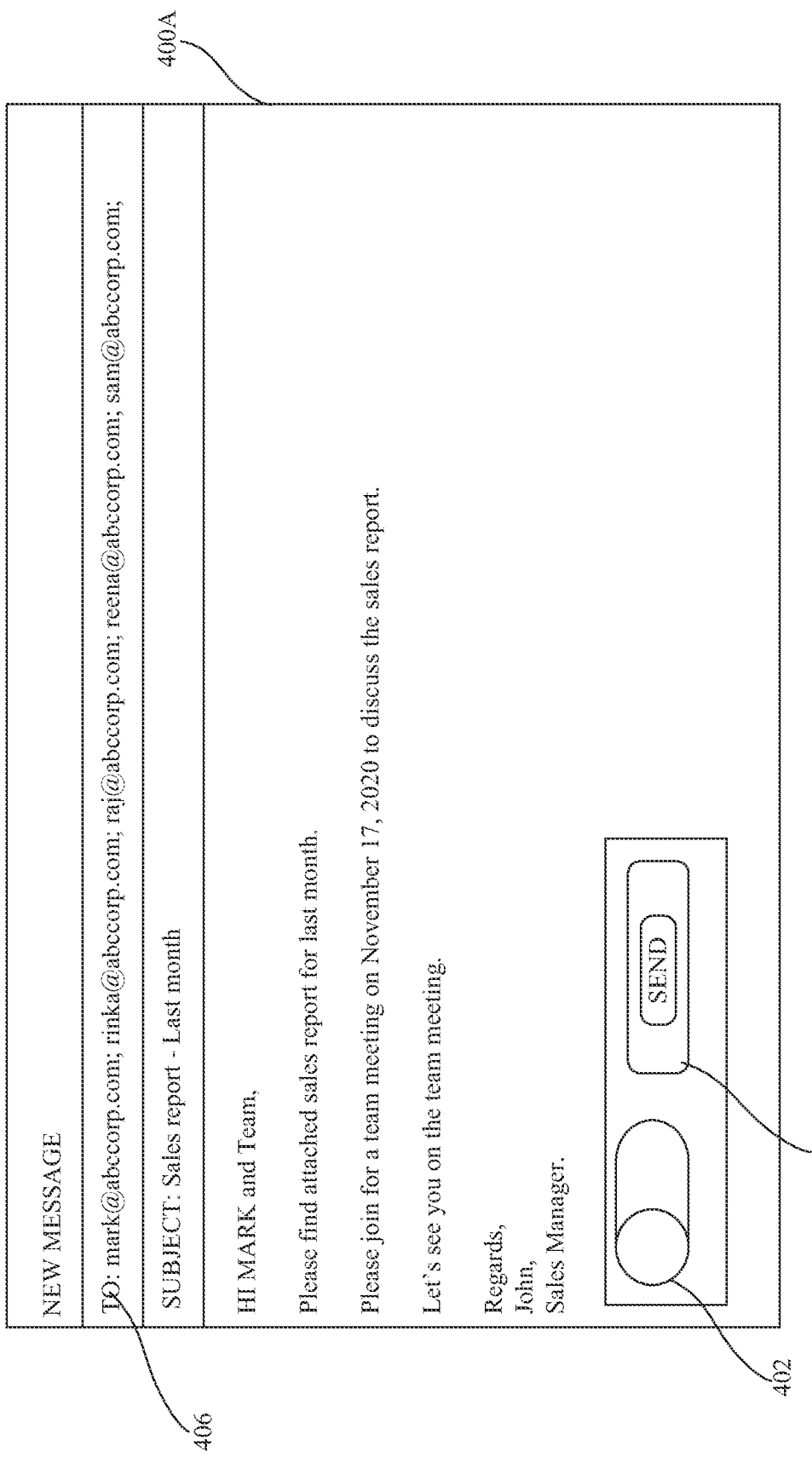
FIG. 4A is an exemplary representation of a user interface for sending an email without pop-up confirmation dialogs where a first element and a second element of the user interface are disabled according to an embodiment herein.

FIG. 4A, with reference to FIGS. 1 through 3B, is an exemplary representation of a user interface 400A for sending an email without pop-up confirmation dialogs where a first element 402 and a second element 404 of the user interface 400A are disabled according to an embodiment herein. The user interface 400A includes the first element 402 and the second element 404 that are in a disabled state. The first element 402 and the second element 404 of the user interface 400A are disabled based on the dynamic rule in the rule database 200 that processes an email recipient list or a message recipient list 406, to determine that a number of recipients is greater than a preconfigured number of recipients. For example, the preconfigured number of recipients is three. It is determined that the email recipient list or the message recipient list 406 includes more than three recipients, thereafter the first element 402 and the second element 404 of the user interface 400A are disabled. After performing a first action on the first element 402, the second element 404 of the user interface 400A may be enabled to send the email or message.

If the email recipient list or the message recipient list 406 is less than the preconfigured number of recipients, the dynamic rule may send the email or send the message by default without performing the first action on the first element 402 of the user interface 400A to enable the second element 404 of the user interface 400A to send the email or send the message.

FIG. 4B, with reference to FIGS. 1 through 4A, is an exemplary representation of a user interface 400B for sending an email without pop-up confirmation dialogs where a first element 408 and a second element 410 of a user interface 400B are enabled according to an embodiment herein. The user interface 400B includes the first element 408 and the second element 410 that are in an enabled state to perform the protected computer operation of sending the email (i.e., sending operation). The first element 408 and the second element 410 of the user interface 400B are enabled by default for usability based on a dynamic rule that processes an email recipient list or a message recipient list 412, to determine that a number of recipients is less than a preconfigured number of recipients. A dynamic rule in a rule database 200 may perform the sending operation by default without performing a first action on the first element 408 of the user interface 400B to enable the second element 410 of the user interface 400B to perform the sending operation.

Figure 5A:
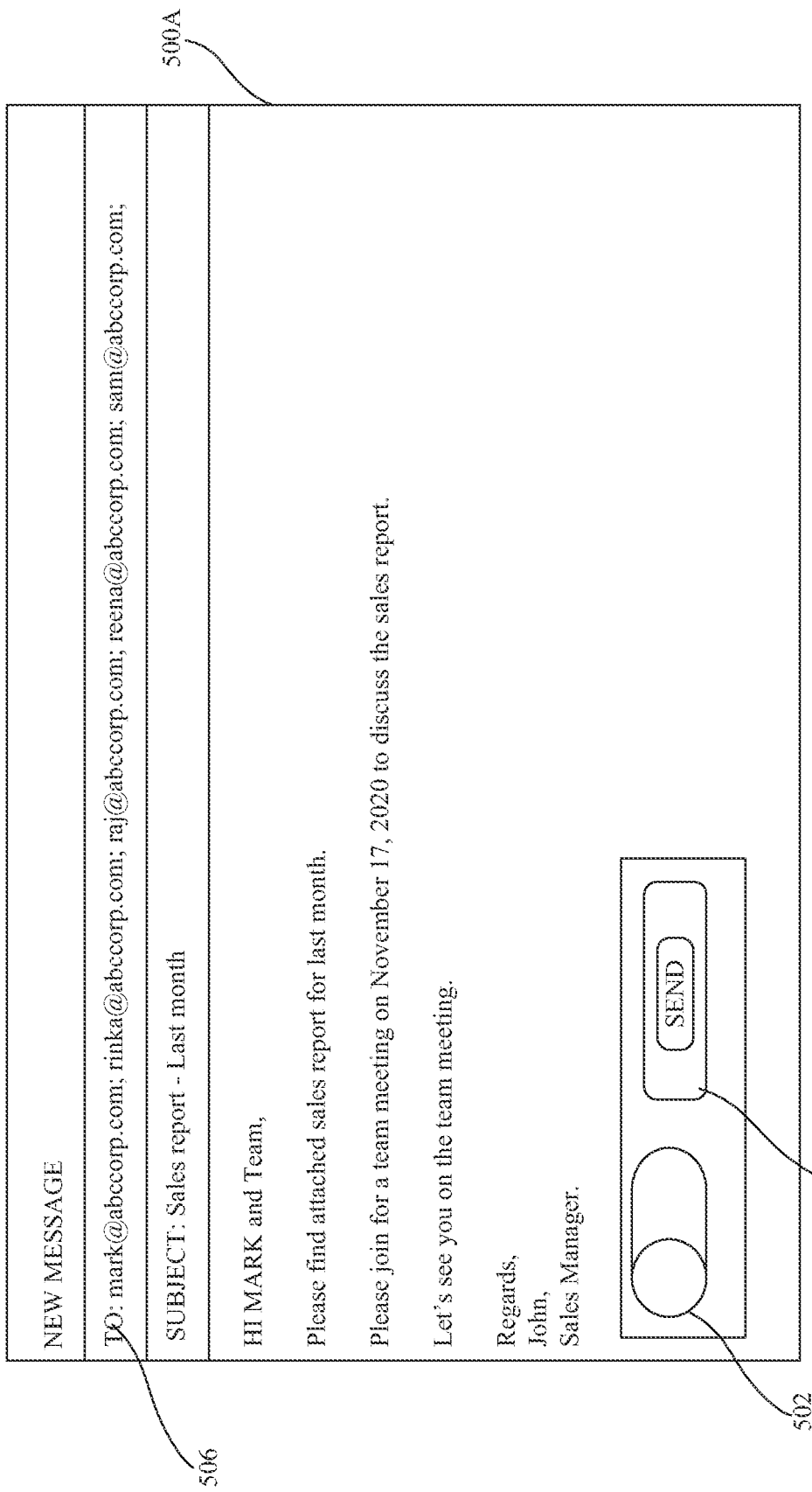
FIG. 5A is an exemplary representation of a user interface for sending an email without pop-up confirmation dialogs where a first element is displayed based on a dynamic rule according to an embodiment herein.

FIG. 5A, with reference to FIGS. 1 through 4B, is an exemplary representation of a user interface 500A for sending an email without pop-up confirmation dialogs where a first element 502 is displayed based on a dynamic rule according to an embodiment herein. The user interface 500A includes the first element 502 and a second element 504 that are in a disabled state. The user interface 500A displays the first element 502 (e.g., toggle button) in the disabled state (which in turn disables the second element 504) based on the dynamic rule in the rule database 200 that processes an email recipient list or a message recipient list 506, to determine that a number of recipients is greater than a preconfigured number of recipients or the email recipient list or the message recipient list 506 includes a preconfigured list of recipients. The user interface 500A does not display the first element 502 if the number of recipients is less than the preconfigured number of recipients or the email recipient list or the message recipient list 506 excludes a preconfigured list of recipients. After performing a first action on the first element 502, the second element 504 of the user interface 500A may be enabled to send the email or message. Similarly, for a delete operation, a user interface may display a first element based on a static rule except for files in a temporary folder. The user interface 500A may not display the first element based on the static rule except where a second element is enabled for performing the delete operation.

Figure 5B:
FIG. 5B is an exemplary representation of a user interface for sending an email without pop-up confirmation dialogs where a first element is not displayed based on a dynamic rule according to an embodiment herein.

FIG. 5B, with reference to FIGS. 1 through 5A, is an exemplary representation of a user interface 500B for sending an email without pop-up confirmation dialogs where a first element is not displayed based on a dynamic rule according to an embodiment herein. The user interface 500B displays a second element 508 that is in an enabled state to perform the protected computer operation of sending the email (i.e., sending operation). The user interface 500B does not display the first element based on the dynamic rule that processes an email recipient list or a message recipient list 510, to determine that a number of recipients is less than a preconfigured number of recipients. Further, the second element 508 of the user interface 500B are enabled by default for usability based on the dynamic rule.

Figure 6:
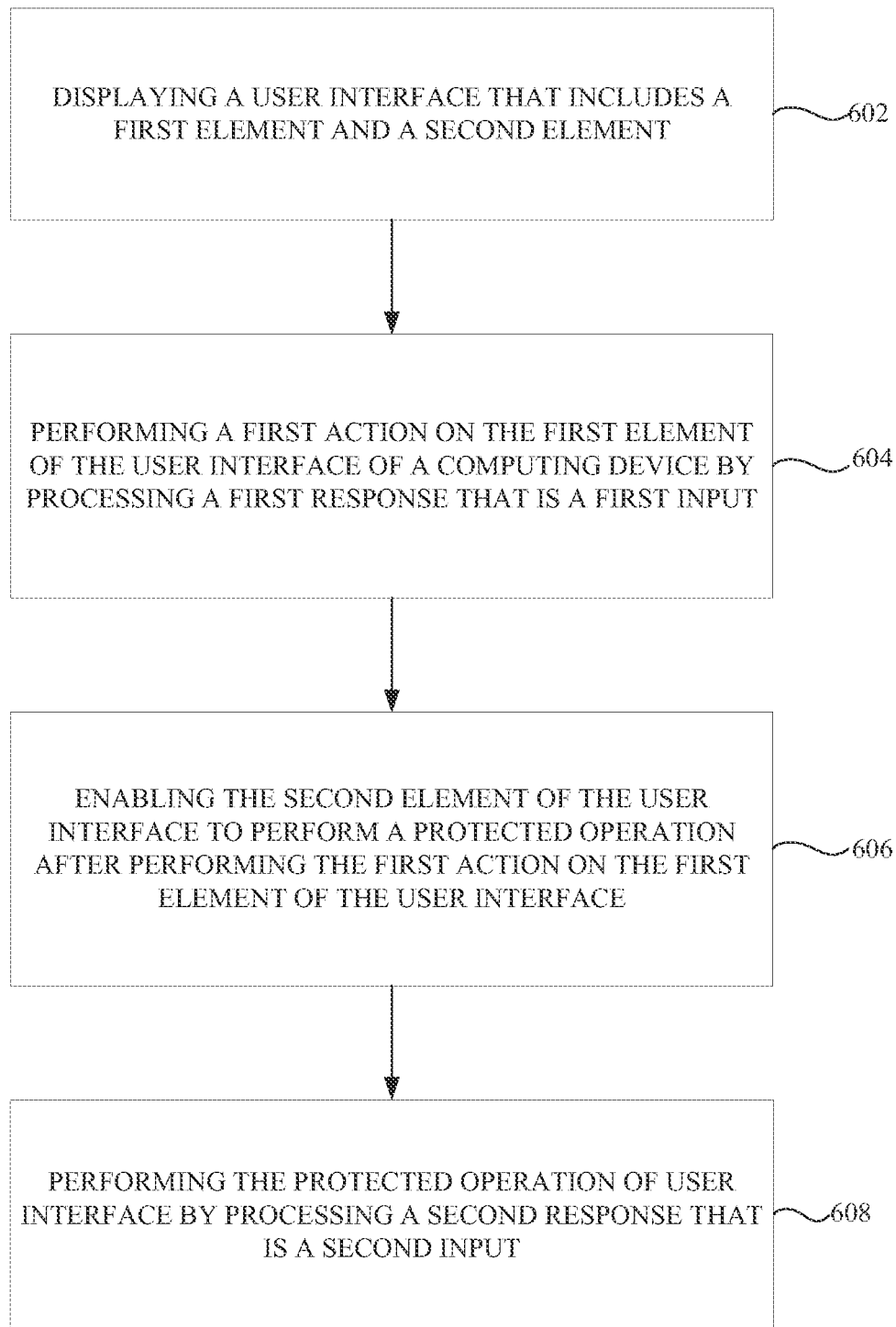
FIG. 6 is a flow diagram that illustrates a method of enabling performance of a protected computer operation on a protected item without pop-up confirmation dialogs being generated according to an embodiment herein.

FIG. 6, with reference to FIGS. 1 through 5B, is a flow diagram that illustrates a method of enabling performance a protected computer operation on a protected item without pop-up confirmation dialogs being generated according to an embodiment herein. At a step 602, the user interface that includes the first element and the second element, is displayed. At a step 604, the first action on the first element of the user interface of the computing device 100 is performed by processing the first response that is the first input. At a step 606, the second element of the user interface is enabled to perform the protected computer operation after performing the first action on the first element of the user interface. At a step 608, the protected computer operation is performed on the user interface by processing the second response that is the second input into the computing device 100.

In some embodiments, the method further includes creating the preconfigured rule that performs the protected computer operation by default without the need for performing the first action on the first element of the user interface to enable the second element of the user interface to perform the protected computer operation. The preconfigured rule may be created to maintain the balance between safety and usability of the protected computer operation in conjunction with existing auxiliary capabilities available to safeguard the protected item.

The method may include storing the preconfigured rule in the rule database 200 including a rule configuration module 208 that is embedded as part of the user interface for the protected item and the rule configuration module 208 varies based on the protected item. The protected computer operation includes: (i) temporarily deleting the item, (ii) permanently deleting the item, (iii) sending the email, (iv) sending the message or similar operations.

In some embodiments, the protected computer operation of sending the email or sending the message utilizes performance of the first action on the first element of the user interface to enable the second element of the user interface to perform the protected computer operation unless the first action is automatically performed based on a dynamic rule that processes an email recipient list attribute or a message recipient list attribute to determine that a number of recipients is less than a preconfigured number of recipients, or a recipient list excludes a preconfigured list of recipients. The recipient list may include an email recipient list or a message recipient list. If the number of recipients is greater than the preconfigured number of recipients, the method may perform the first action on the first element of the user interface to enable the second element of the user interface to perform the protected computer operation of sending the email or sending the message.

In some embodiments, the protected computer operation of deleting the item is enabled by default for usability, upon determining based on a static rule specifying locations where performance of the first action on the first element of the user interface to enable the second element of the user interface to perform the protected computer operation is not utilized. The static rule may be created for improving the usability of the protected computer operation given the existence of auxiliary capabilities available to safeguard the protected computer operation.

Figure 7:
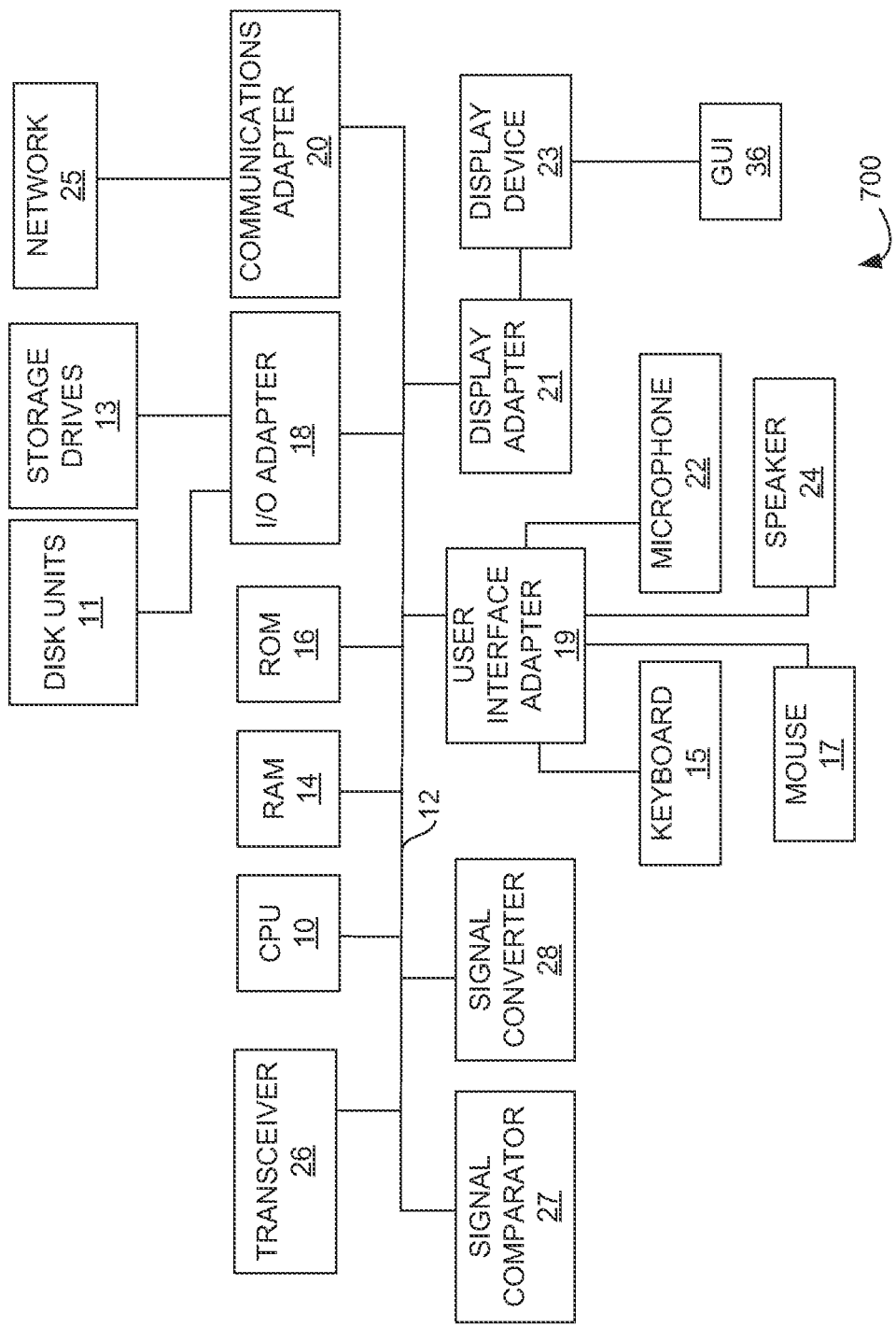
FIG. 7 is a schematic diagram of computer architecture of a system, in accordance with the embodiments herein.

A representative hardware environment for practicing the embodiments herein is depicted in FIG. 7 with reference to FIGS. 1 through 6. This schematic drawing illustrates a hardware configuration of system 700, in accordance with the embodiments herein. The hardware configuration includes at least one processing device 10 and a cryptographic processor 11. The system 700 may include one or more of a personal computer, a laptop, a tablet device, a smartphone, a mobile communication device, a personal digital assistant, or any other such computing device, in one example embodiment. The system 700 includes one or more processor (e.g., the processor 104) or central processing unit (CPU) 10. The CPUs 10 are interconnected via system bus 12 to various devices such as a random-access memory (RAM) 14, read-only memory (ROM) 16, and an input/output (I/O) adapter 18. Although, CPUs 10 are depicted, it is to be understood that the system 700 may be implemented with only one CPU.

The I/O adapter 18 can connect to peripheral devices, such as disk units 11 and storage drives 13 (tape drives), or other program storage devices that are readable by the system. The system 700 can read the inventive instructions on the program storage devices and follow these instructions to execute the methodology of the embodiments herein. The system 700 further includes a user interface adapter 19 that connects a keyboard 15, mouse 17, speaker 24, microphone 22, and/or other user interface devices such as a touch screen device (not shown) to the bus 12 to gather user input.

Additionally, a communication adapter 20 connects the bus 12 to a data processing network, and a display adapter 21 connects the bus 12 to a display device 23, which provides a graphical entity interface (GUI) 36 of the output data in accordance with the embodiments herein, or which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric signals.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing or executing program code will include at least one processor coupled directly or indirectly to memory elements through a system bus. The memory elements can include local memory employed during actual execution of the program code, bulk storage, Subscriber Identity Module (SIM) card, and cache memories which provide temporary storage of at least some program code in order to reduce the number of times code must be retrieved from bulk storage during execution. Input/output (I/O) devices (including but not limited to keyboards, displays, pointing devices, remote controls, camera, microphone, temperature sensor, accelerometer, gyroscope, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor-implemented method for enabling performance of a protected computer operation on a protected item without pop-up confirmation dialogs being generated, the method comprising:

performing a first action on a first element of a user interface of a computing device, wherein the first action is associated with the protected computer operation, by processing a first response that is a first input into the computing device, wherein performing the first action on the first element of the user interface enables a second element of the user interface to perform the protected computer operation, wherein the protected computer operation is performed by processing a second response that is a second input into the computing device, wherein the protected computer operation comprises: (i) temporarily deleting an item, (ii) permanently deleting an item, (iii) sending an email, or (iv) sending a message, wherein the protected computer operation of sending the email or sending the message utilizes performance of the first action on the first element of the user interface to enable the second element of the user interface to perform the protected computer operation unless the first action is automatically performed based on a dynamic rule that processes an email recipient list attribute or a message recipient list attribute to determine that a number of recipients is less than a preconfigured number of recipients, or a recipient list excludes a preconfigured list of recipients, and wherein the recipient list comprises an email recipient list or a message recipient list.

2. The processor-implemented method of claim 1, comprising creating a preconfigured rule that performs the protected computer operation by default without a need for performing the first action on the first element of the user interface to enable the second element of the user interface to perform the protected computer operation, wherein the preconfigured rule is created to maintain a balance between safety and usability of the protected computer operation in conjunction with existing auxiliary capabilities available to safeguard the protected item.

3. The processor-implemented method of claim 2, comprising storing the preconfigured rule in a rule database comprising a rule configuration module that is embedded as part of the user interface for the protected item and the rule configuration module varies based on the protected item.

4. The processor-implemented method of claim 3, wherein the rule database comprises:

a static rule that is dependent on first attributes of the protected item that do not change as part of the protected computer operation; and a dynamic rule that is dependent on second attributes of the protected item that are changeable as part of the protected computer operation.

5. The processor-implemented method of claim 1, wherein if the number of recipients is greater than the preconfigured number of recipients or the recipient list comprises a preconfigured list of recipients, the method utilizes performance of the first action on the first element of the user interface to enable the second element of the user interface to perform the protected computer operation of sending the email or sending the message.

6. The processor-implemented method of claim 1, wherein deleting the item is enabled by default for usability, upon determining based on a static rule specifying locations where performance of the first action on the first element of the user interface to enable the second element of the user interface to perform the protected computer operation is not utilized, and wherein the static rule is created for improving the usability of the protected computer operation given an existence of auxiliary capabilities available to safeguard the protected computer operation.

7. A system for enabling performance of a protected computer operation on a protected item without pop-up confirmation dialogs being generated, the system comprising a computing device that comprises:

a memory that stores a set of instructions; and a processor that executes the set of instructions comprising:

performing a first action on a first element of a user interface of the computing device, wherein the first action is associated with the protected computer operation, by processing a first response that is a first input into the computing device, wherein performing the first action on the first element of the user interface enables a second element of the user interface to perform the protected computer operation, and wherein the protected computer operation is performed by processing a second response that is a second input into the computing device, wherein the protected computer operation comprises: (i) temporarily deleting an item, (ii) permanently deleting an item, (iii) sending an email, or (iv) sending a message, wherein the protected computer operation of sending the email or sending the message utilizes performance of the first action on the first element of the user interface to enable the second element of the user interface to perform the protected computer operation unless the first action is automatically performed based on a dynamic rule that processes an email recipient list attribute or a message recipient list attribute to determine that a number of recipients is less than a preconfigured number of recipients, or a recipient list excludes a preconfigured list of recipients, and wherein the recipient list comprises an email recipient list or a message recipient list.

8. The system of claim 7, wherein the processor creates a preconfigured rule that performs the protected computer operation by default without a need for performing the first action on the first element of the user interface to enable the second element of the user interface to perform the protected computer operation, wherein the preconfigured rule is created to maintain a balance between safety and usability of the protected computer operation in conjunction with existing auxiliary capabilities available to safeguard the protected item.

9. The system of claim 8, wherein the processor stores the preconfigured rule in a rule database comprising a rule configuration module that is embedded as part of the user interface for the protected item and the rule configuration module varies based on the protected item.

10. The system of claim 9, wherein the rule database comprises:

a static rule that is dependent on first attributes of the protected item that do not change as part of the protected computer operation; and a dynamic rule that is dependent on second attributes of the protected item that are changeable as part of the protected computer operation.

11. The system of claim 7, wherein if the number of recipients is greater than the preconfigured number of recipients or the recipient list comprises a preconfigured list of recipients, the processor utilizes performance of the first action on the first element of the user interface to enable the second element of the user interface to perform the protected computer operation of sending the email or sending the message.

12. The system of claim 7, wherein the processor enables the protected computer operation of deleting the item by default for usability, upon determining based on a static rule specifying locations where performance of the first action on the first element of the user interface to enable the second element of the user interface to perform the protected computer operation is not utilized, and wherein the static rule is created for improving the usability of the protected computer operation given an existence of auxiliary capabilities available to safeguard the protected computer operation.

13. One or more non-transitory computer readable storage mediums storing one or more sequences of instructions, which when executed by one or more processors, causes a method for enabling performance of a protected computer operation on a protected item without pop-up confirmation dialogs being generated, comprising:
  performing a first action on a first element of a user interface of a computing device, wherein the first action is associated with the protected computer operation, by processing a first response that is a first input into the computing device, wherein performing the first action on the first element of the user interface enables a second element of the user interface to perform the protected computer operation, wherein the protected computer operation is performed by processing a second response that is a second input into the computing device, wherein the protected computer operation comprises: (i) temporarily deleting an item, (ii) permanently deleting an item, (iii) sending an email, or (iv) sending a message, wherein the protected computer operation of sending the email or sending the message utilizes performance of the first action on the first element of the user interface to enable the second element of the user interface to perform the protected computer operation unless the first action is automatically performed based on a dynamic rule that processes an email recipient list attribute or a message recipient list attribute to determine that a number of recipients is less than a preconfigured number of recipients, or a recipient list excludes a preconfigured list of recipients, and wherein the recipient list comprises an email recipient list or a message recipient list.

14. The non-transitory computer readable storage mediums storing the one or more sequences of instructions of claim 13, which when executed by said processor, further causes the method to create a preconfigured rule that performs the protected computer operation by default without a need for performing the first action on the first element of the user interface to enable the second element of the user interface to perform the protected computer operation, wherein the preconfigured rule is created to maintain a balance between safety and usability of the protected computer operation in conjunction with existing auxiliary capabilities available to safeguard the protected item.

15. The non-transitory computer readable storage mediums storing the one or more sequences of instructions of claim 14, which when executed by said processor, further causes the method to store the preconfigured rule in a rule database comprising a rule configuration module that is embedded as part of the user interface for the protected item and rule configuration module varies based on the protected item.

16. The non-transitory computer readable storage mediums storing the one or more sequences of instructions of claim 15, wherein the rule database comprises:
  a static rule that is dependent on first attributes of the protected item that do not change as part of the protected computer operation; and
  a dynamic rule that is dependent on second attributes of the protected item that are changeable as part of the protected computer operation.

17. The non-transitory computer readable storage mediums storing the one or more sequences of instructions of claim 13, wherein if the number of recipients is greater than the preconfigured number of recipients or the recipient list comprises a preconfigured list of recipients, the method utilizes performance of the first action on the first element of the user interface to enable the second element of the user interface to perform the protected computer operation of sending the email or sending the message.

18. The non-transitory computer readable storage mediums storing the one or more sequences of instructions of claim 13, wherein deleting the item is enabled by default for usability, upon determining based on a static rule specifying locations where performance of the first action on the first element of the user interface to enable the second element of the user interface to perform the protected computer operation is not utilized, and wherein the static rule is created for improving the usability of the protected computer operation given an existence of auxiliary capabilities available to safeguard the protected computer operation.

* * * * *